(12) United States Patent
Ruff

(10) Patent No.: US 7,653,897 B2
(45) Date of Patent: Jan. 26, 2010

(54) DISPLAYING USER OPERATION DATA

(75) Inventor: Frederick John Ruff, Richmond, CA (US)

(73) Assignee: AUTODESK, Inc., San Rafael, CA (US)

(*) Notice: Subject to any disclaimer, the term of this patent is extended or adjusted under 35 U.S.C. 154(b) by 510 days.

(21) Appl. No.: 10/894,820

(22) Filed: Jul. 19, 2004

(65) Prior Publication Data

US 2005/0022165 A1    Jan. 27, 2005

Related U.S. Application Data

(60) Provisional application No. 60/488,834, filed on Jul. 21, 2003.

(51) Int. Cl.
*G06F 9/44* (2006.01)

(52) U.S. Cl. ............... 717/121; 713/1; 713/2; 715/965; 715/966

(58) Field of Classification Search ............. 717/121; 713/1, 2; 715/965, 966, 967; 702/119
See application file for complete search history.

(56) References Cited

U.S. PATENT DOCUMENTS

| | | | |
|---|---|---|---|
| 5,790,120 A | | 8/1998 | Lozares et al. |
| 5,825,361 A | * | 10/1998 | Rubin et al. ............ 715/839 |
| 6,049,871 A | * | 4/2000 | Silen et al. ............ 713/2 |
| 6,173,445 B1 | * | 1/2001 | Robins et al. ............ 717/173 |
| 6,356,965 B1 | | 3/2002 | Broyles et al. |
| 6,490,678 B1 | * | 12/2002 | Aquilar et al. ............ 713/2 |
| 6,567,627 B2 | * | 5/2003 | Maeda et al. ............ 399/81 |
| 7,073,051 B2 | * | 7/2006 | Touchet ............ 713/1 |
| 7,199,886 B2 | * | 4/2007 | Brandl ............ 358/1.13 |
| 7,441,201 B1 | * | 10/2008 | Printezis ............ 715/762 |

FOREIGN PATENT DOCUMENTS

EP            959408 A2 * 11/1999

* cited by examiner

*Primary Examiner*—Wei Y Zhen
*Assistant Examiner*—Matthew J Brophy
(74) *Attorney, Agent, or Firm*—Patterson & Sheridan, LLP

(57) ABSTRACT

A computer system includes a processing unit that processes data in response to instructions read from memory. Before being ready for a user to make use of a loaded application, the system initially loads executable instructions from permanent storage (such as a magnetic disc drive) during a loading process. In order to make better use of this time, operation related data (that is data for assisting a user to operate the system) is displayed during the loading process. The operation related data is stored in a user accessible file. Furthermore, the application itself facilitates the user re-configuration of the user accessible file under the control of the processing unit when the processing unit is executing the instructions; it not being necessary to use a third party text editor and navigate through the file structure. Then, during a subsequent instruction loading process, the user re-configured data is read.

14 Claims, 12 Drawing Sheets

DISPLAYING USER OPERATION DATA

CROSS-REFERENCE TO RELATED APPLICATIONS

This application claims benefit of U.S. provisional patent application Ser. No. 60/488,834, filed Jul. 21, 2003, which is herein incorporated by reference.

BACKGROUND OF THE INVENTION

1. Field of the Invention

Embodiments of the present invention generally relate to operation related data for an application.

2. Description of the Related Art

In computer systems, processing units process data in response to instructions read from memory. The computer's main memory is usually volatile in that the instructions are lost when power is removed and it is this feature which leads to the flexibility of computer systems in that many different program suites may be loaded thereby allowing the computer system to perform many different tasks, usually referred to as "applications".

Executable instructions are loaded into memory from permanent storage, which may take the form of a local disc drive or a networked drive or an array of drives etc. The time taken for the loading process to be carried out may vary from a few seconds to several minutes depending upon the size of the application. Furthermore, after loading instructions, the computer system may need to perform internal initialisation tasks before being placed in a condition suitable for receiving user input.

The time taken for loading is also increased significantly if additional programs are required, such as those provided by third party vendors and often referred to as "plug-ins". During the loading process, it is known to display information to users in the form of images and text that have become known as "splash screens". However, when users are very familiar with a particular application, much of the information conveyed to them in this way is often little interest. Thus, problem exists in terms of making better use of a user's time during the loading and initialisation processes.

SUMMARY OF THE INVENTION

The present invention generally facilitates the display and re-configuration of operation related data for an application. The operation related data is stored in a user accessible file and may be displayed during loading of the application. Displaying the operation related data and permitting a user to re-configure the operation related data during loading and initialization of the application allows the user to accomplish configuration of the application while the application is being loaded.

Various embodiments of the invention include a computer readable medium storing instructions for causing a computer to re-configure operation related data by reading operation related data stored in a text file during an application loading process, displaying a first splash screen including the operation related data, receiving an input specifying a modification to the operation related data, and producing re-configured operation related data including the modification.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
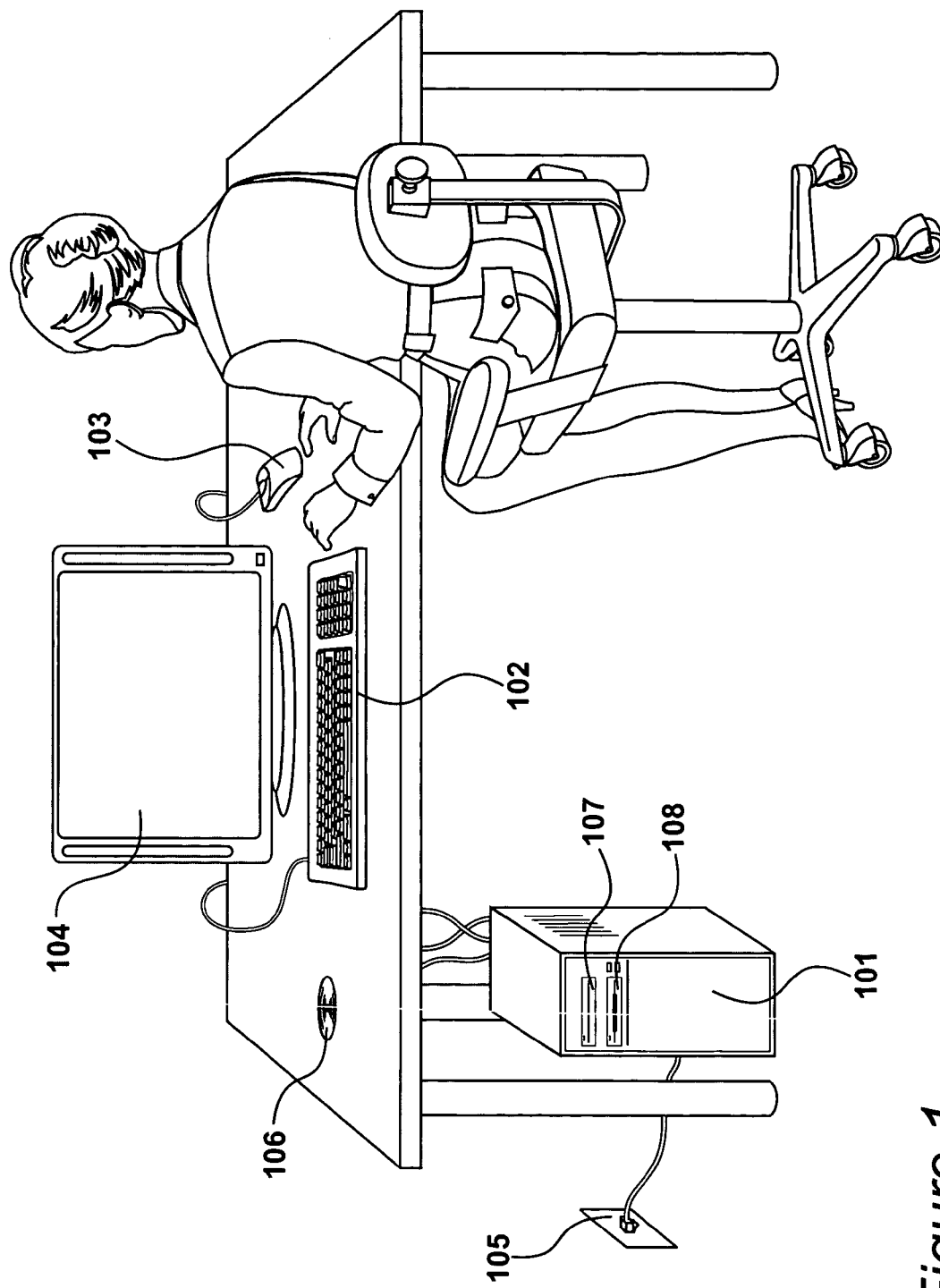
FIG. 1 shows an environment for processing three dimensional image data, according to one embodiment of the present invention.

FIG. 1 shows an environment for processing three dimensional image data, according to one embodiment of the present invention. Data processing is effected by a programmable computer system 101 that responds to input data from a user via a keyboard 102, and a mouse 103, or similar manually operable input devices. Output data from computer system 101 is displayed to the user via a visual display unit 104. A network connection 105 allows the computer system 101 to communicate with a local server and also facilitates communication externally via the internet.

Computer system 101 receives input data from the keyboard 102 and other input devices via cable connections although in alternative embodiments radio interfaces could be provided. Many different types of programmable computer system 101 could be deployed and in alternative embodiments the functionality could be provided using dedicated hardware.

Instructions executable by computer system 101 are installed via an instruction carrying medium such as a CD-ROM 106 or a similar instruction carrying medium such as a DVD etc. The computer system 101 may also have devices for recording output data, such as CD-ROM burners or DVD burner 107 or removable magnetic disk storage device 108, for example.

Figure 2:
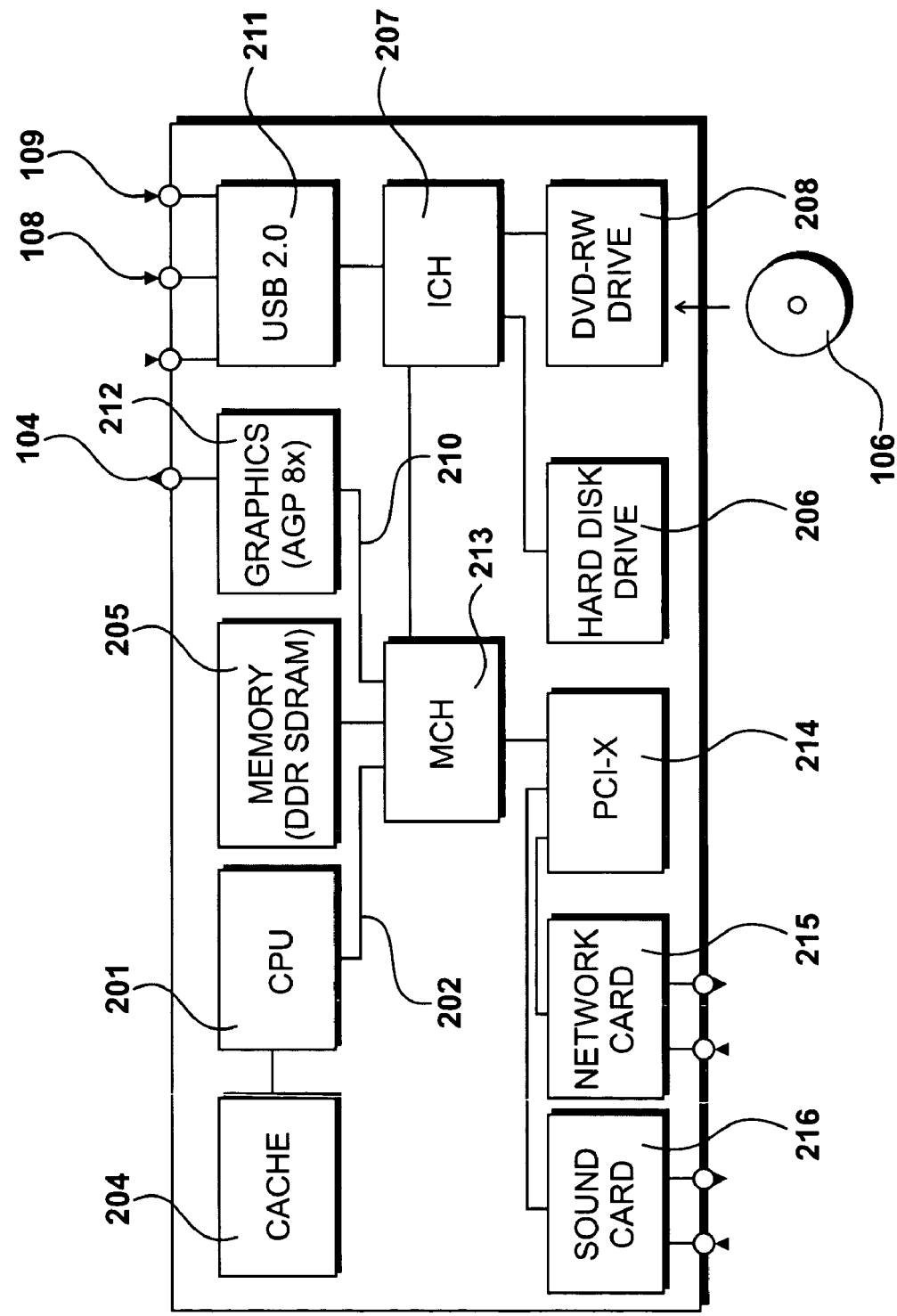
FIG. 2 details components of the computer system shown in FIG. 1, according to one embodiment of the present invention.

FIG. 2 is a block diagram including the components of computer system 101, according to one embodiment of the present invention. In some embodiments of the present invention, the components are based upon the Intel® E7505 hub-based Chipset.

The system includes an Intel® Pentium™ Xeon™ DP central processing unit (CPU) 201 running at three Gigahertz (3 GHz), which fetches instructions for execution and manipulates data via an Intel® E7505 533 Megahertz system bus 202 providing connectivity with a Memory Controller Hub (MCH) 203. The CPU 201 has a secondary cache 204 comprising five hundred and twelve kilobytes of high speed static RAM, for storing frequently-accessed instructions and data to reduce fetching operations from a larger main memory 205 via the memory controller hub 203. The memory controller hub 203 thus co-ordinates data and instruction flow with the main memory 205, which is at least one gigabyte in storage capacity, in this embodiment of the present invention. Instructions and data are thus stored in the main memory 205 and the cache 204 for swift access by the CPU 201.

A hard disk drive 206 provides non-volatile bulk storage of instructions and data via an Input/Output Controller Hub (ICH) 207. The controller hub 207 also provides connectivity to storage devices 108 and 109, as shown in FIG. 1. USB 2.0 interface 211 also provides connectivity to manually operable input devices, such as 102, 103 and 104.

A graphics card 212 receives graphic data and instructions from the CPU 201. The graphics card 212 is connected to the memory controller hub 203 by means of a high speed AGP graphics bus 213. A PCI interface 214 provides connections to a network card 215 that provides access to the network connection 106, over which instructions and or data may be transferred. A sound card 216 is also connected to the PCI interface 214 and receives sound data or instructions from the CPU 201.

The equipment shown in FIG. 2 constitutes the components of a high-end IBM™ PC compatible processing system. In an alternative embodiment of the present invention, similar functionality is achieved using an Apple™ PowerPC™ architecture-based processing system.

Figure 3:
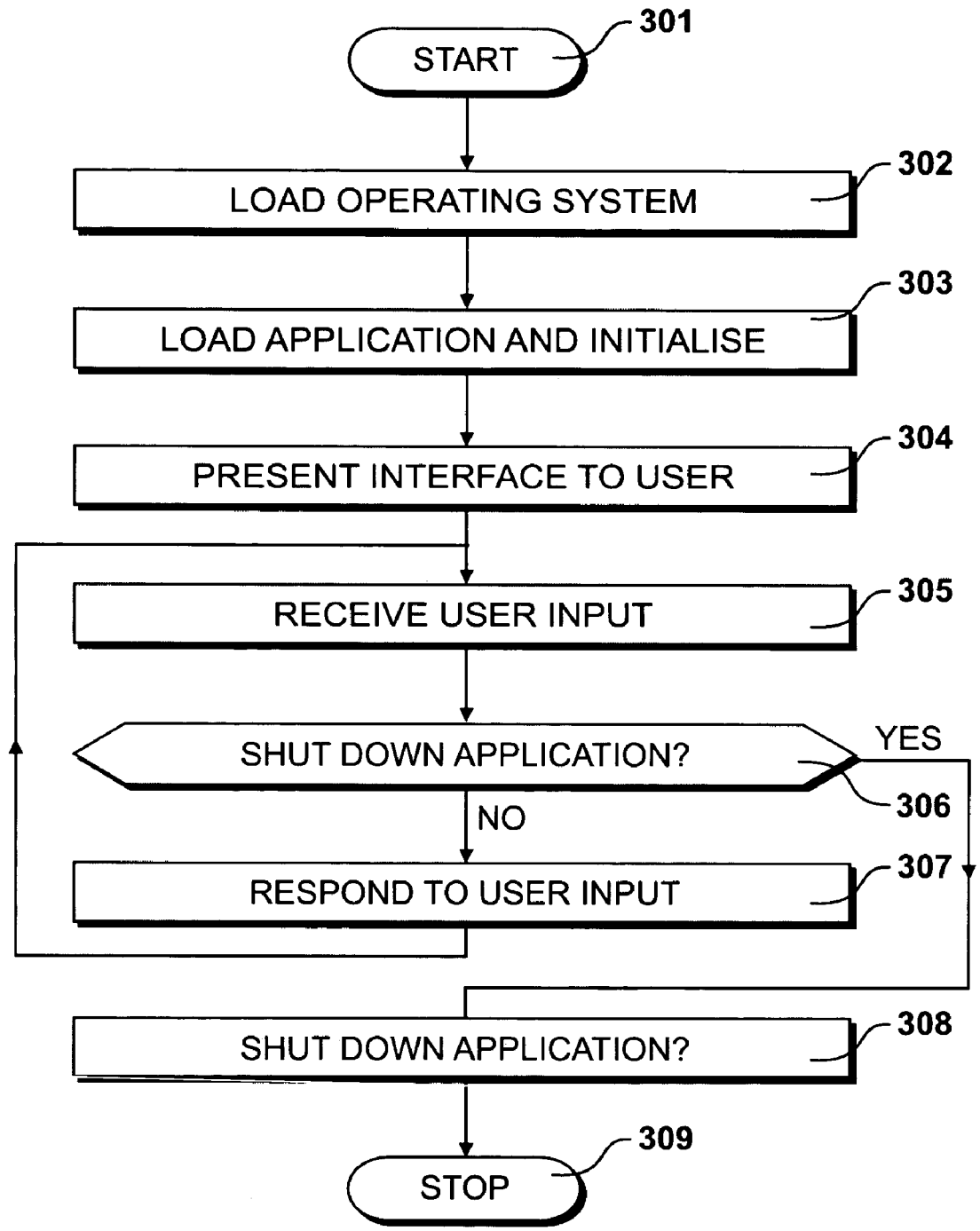
FIG. 3 illustrates operations performed by the system shown in FIG. 2, according to one embodiment of the present invention.

FIG. 3 illustrates operations performed by the system shown in FIG. 2, according to one embodiment of the present invention. After starting operation at step 301, instructions defining an operating system are loaded at step 302. In some embodiments of the present invention, the operating system is Microsoft™ Windows™ but in alternative embodiments of the present invention other operating systems may be used such as MacX™ or Linux, for example.

At step 303 instructions for the application of an embodiment of the present invention are loaded and initialised resulting in a user interface being displayed at step 304.

At step 305 a user input command is received either in response to operation of keyboard 102 or in response to operation of the mouse 104.

At step 306 a question is asked as to whether a shutdown command has been received and if this is answered in the affirmative the application is shut down at step 308 and the procedure is stopped 309. Alternatively, if the question asked at step 306 is answered in the negative, the application responds to the user input (received at step 305) at step 307. Thereafter, further input commands are received at step 305 and further responses are made at step 307 until a shutdown command is received and the question asked at step 306 is answered in the affirmative.

Figure 4:
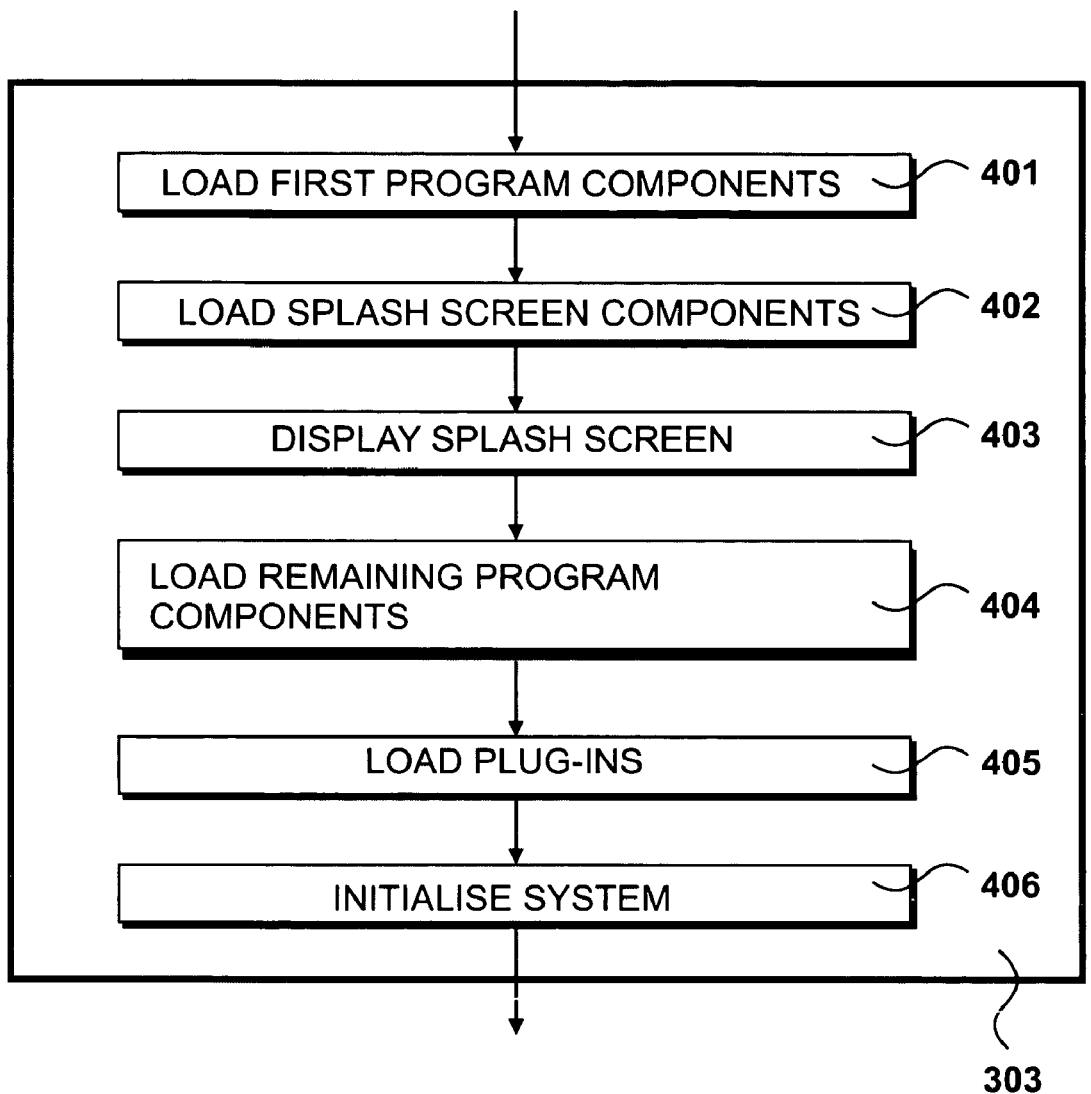
FIG. 4 shows procedures for loading an application, according to one embodiment of the present invention.

FIG. 4 shows procedures for loading an application, according to one embodiment of the present invention. At step 401 first program components are loaded such that, at step 402 splash screen components are loaded and then subsequently displayed at step 403. The splash screen represents a window of information displayed to a user to show that progress is being made in terms of loading the application and, in this embodiment of the present invention, allows operation related data to be displayed to the user during the loading process. As used herein, operation related data concerns information that assist the user in terms of their use of the application itself. In one embodiment of the present invention, the operation related data is stored in a user accessible file thereby facilitating user reconfiguration of the file. Furthermore, it is possible for this reconfiguration to be performed under the control of the processing unit when the processing unit is executing instructions of the application.

Consequently, at step 404 remaining program components are loaded whereafter, in many situations, additional programs, often provided by third party vendors are loaded for inclusion within the application itself. These additional programs are often referred to as "plug-ins" and may be acquired separately or in combination with the application itself. Many applications facilitate a degree of customisation and this degree is significantly enhanced by the inclusion of a specific selected set of plug-ins. Thus, applications that at first appear similar may in fact perform very different tasks given the availability of plug-ins provided for them.

Figure 5:
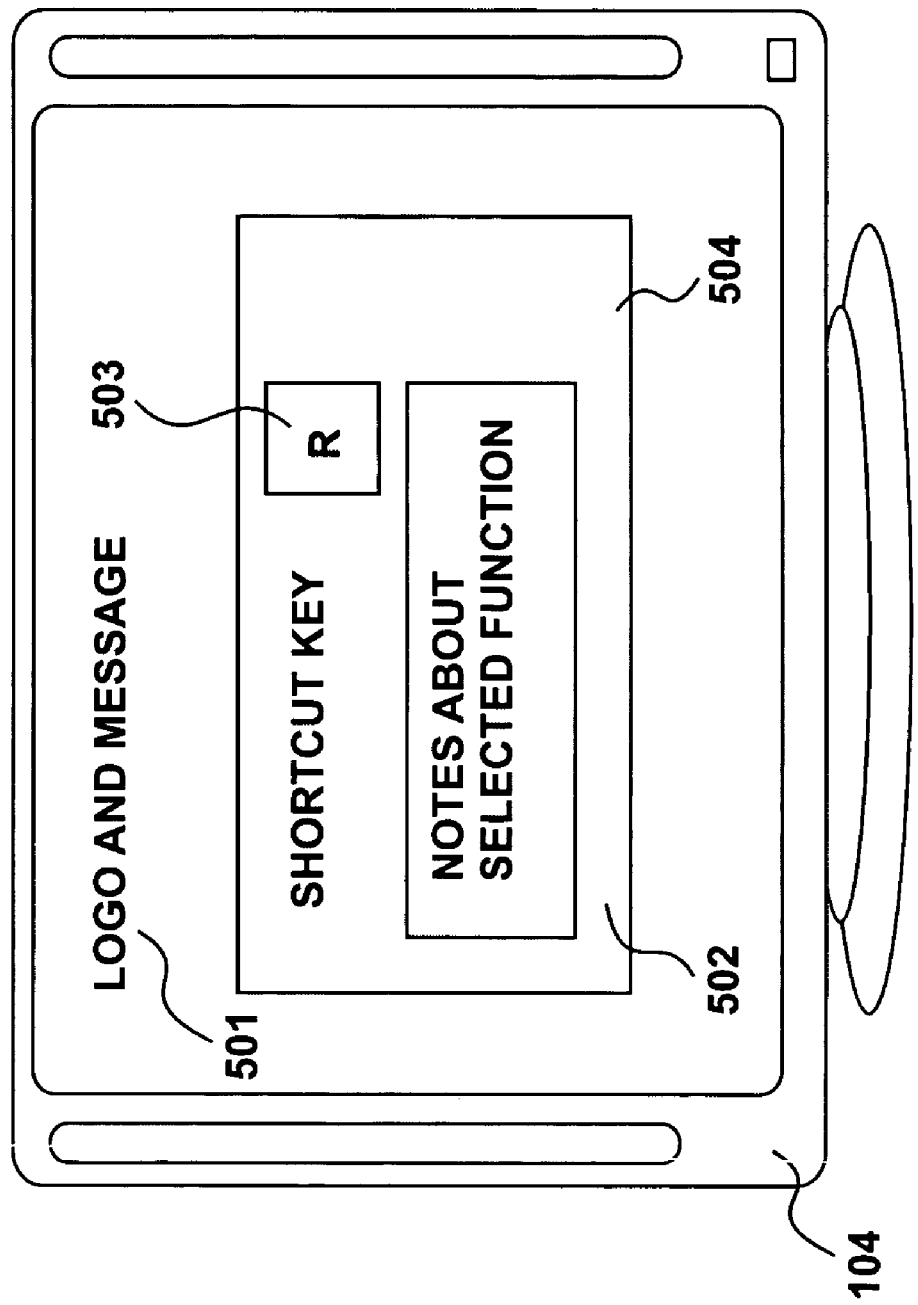
FIG. 5 shows a splash screen image, according to one embodiment of the present invention.

FIG. 5 shows a splash screen image, according to one embodiment of the present invention. As previously stated, the splash screen is displayed at step 403 resulting in an image of the type shown in FIG. 5 being displayed on monitor 104. In one embodiment of the present invention, as user interacts with the application in order to create, modify or manipulate image data such as machine-readable definitions of three dimensional objects. However, it should be appreciated that many other embodiments of the present invention are possible, such as those manipulating other types of image data or those manipulating different types of data, such as text, communications data or audio etc.

In one embodiment of the present invention, the operation related data presented to the user relates to the availability of shortcut keys. As their name suggests, shortcut keys may be invoked (for example) by depressing a character key (a letter key) while the control key is held down. A particular function is associated with the shortcut key and that function is called when the shortcut key is pressed. Thus, these keys allow functions to be selected quickly, as an alternative to selecting the functions from a pull-down menu or similar graphical representation requiring operation of mouse 103.

In some applications, the assignment of shortcut keys is fixed such that any user using an application, possibly on a different computer system, will be aware to the availability of shortcut keys will therefore not require any additional training when using a different machine.

However, other types of application exist in which the application may perform different functions in different environments. In such applications many functions may be available but it is likely that a particular user type would require regular access to a particular subset of these functions with a different user environment requiring a different subset of functions. Consequently, in order to optimise the use of shortcut keys, particularly in an environment where users are under pressure to complete work within cost effective time scales, shortcut key allocation is made configurable, as in one embodiment of the present invention.

Furthermore, in order to remind a user of the shortcut key allocation that has been made, a particular shortcut key definition is selected during the initialisation of the system and is presented as a splash screen, as shown in FIG. 5.

In the present application, all twenty six letter keys may be allocated to provide a shortcut for a specified function. During start-up, one particular key is selected (effectively pseudo-randomly) and identified to the user as part of the splash screen. In the splash screen shown in FIG. 5 a logo and a message is displayed to the user at 501. This remains constant for each splash screen and would be application specific, possible identifying the source of the application followed by the application specific name and possibly a version number.

A splash screen window 502 is displayed in which a specific shortcut key 503 is presented along with notes at 504 detailing attributes of the particular function that will be selected by operation of shortcut key 503.

Thus the application, once running, facilitates user configuration of the user accessible file so as to allow reconfiguration (in this embodiment of the present invention) of shortcut key allocations. Furthermore, on start-up, user reconfigured operation related data is read and presented to the user, in the form of the splash screen shown in FIG. 5, so as to remind the user of shortcut key allocations that have been made. This provides an "aid memoirs" to the user who has redefined the shortcut keys. Furthermore, it also provides information to other users who may, for what ever reason, be in a position to use the reconfigured machine.

Thus, a technical effect enhances the usability of the system and, in particular, ensures the efficiency of a regular user within a professional environment in which complex applications are being exercised under time and money constraints. It is acknowledged that it would be desirable for the loading and the initialisation process to be performed more quickly. However, there has been a tendency for applications to grow in line with enhanced transfer and storage speeds. Furthermore, the main provider of the application often has little control over the extent to which plug-ins are required for a specific user and the loading of plug-ins will inevitably increase the time during which the loading process occurs.

Figure 6:
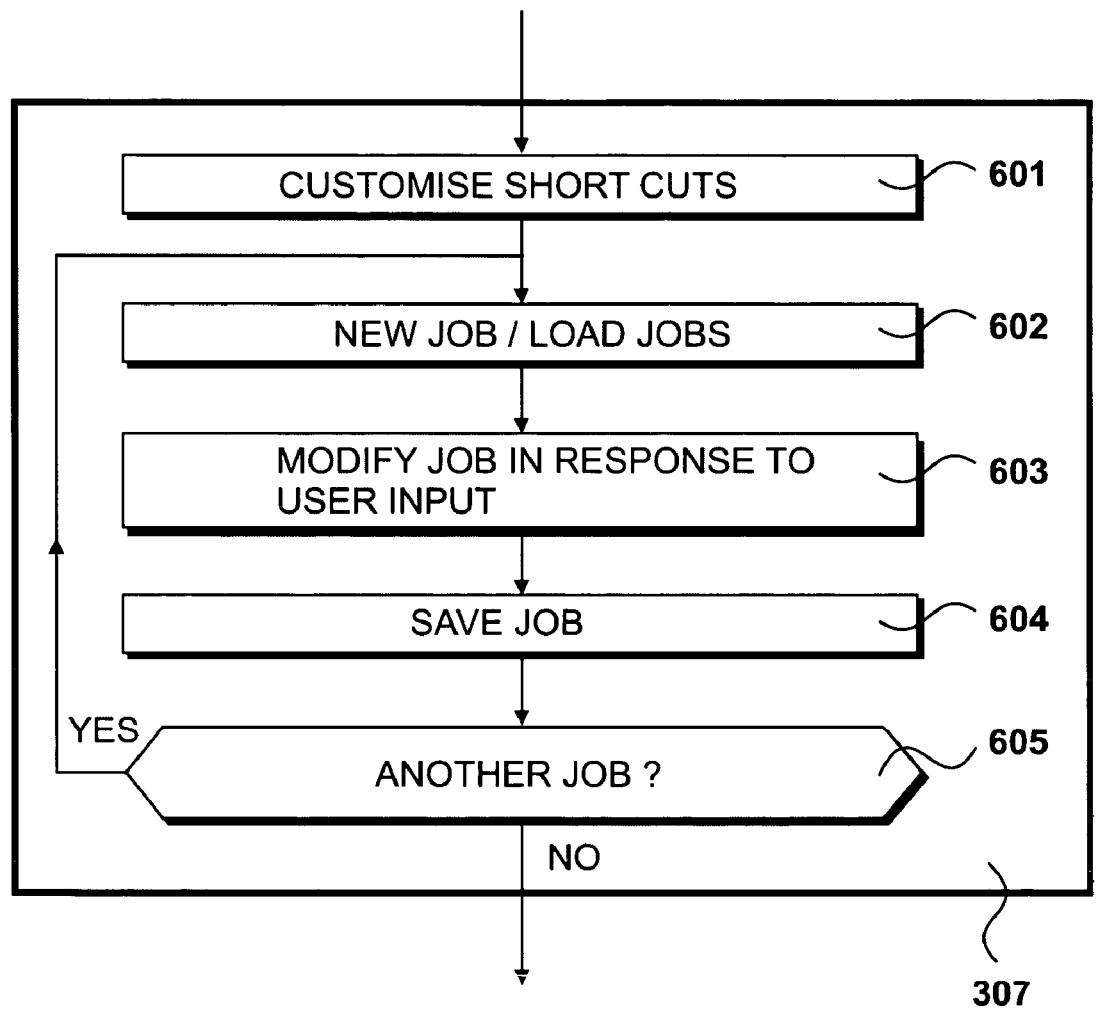
FIG. 6 shows procedures for responding to a user input, according to one embodiment of the present invention.

FIG. 6 shows procedures for responding to a user input, according to one embodiment of the present invention. At 601 a user may customise shortcut allocations and, in one embodiment of the present invention, these customisations will be reflected in splash screens presented to the user during the loading and initialisation stages, as previously described.

After shortcut allocations have been customised a user may initiate a new job or load an existing job at step 602.

At step 603 modifications to application generated data are made in response to user input. When completed, the job is saved at step 604 and at step 605 a question is asked as to whether another job is to be processed. If this question is answered in the affirmative, control is returned to step 602 and work then commences on the next job. When no further jobs are required for modification, the question asked at step 605 is answered in the negative which may then result in the application being shut down as previously described.

Figure 7:
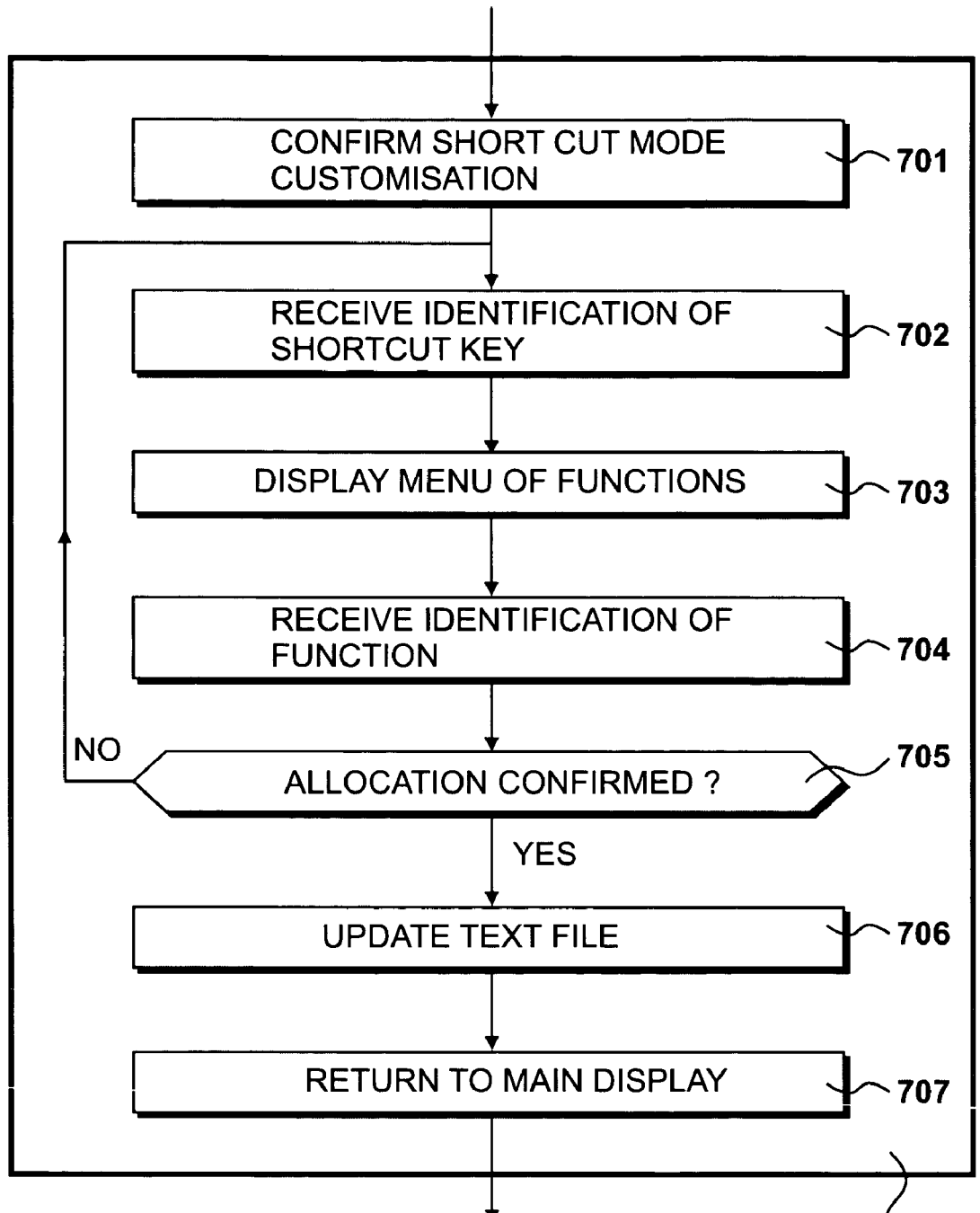
FIG. 7 shows a procedure for the customisation of shortcut key allocations, according to one embodiment of the present invention.

FIG. 7 shows procedures 601 for the customisation of shortcut allocations, according to one embodiment of the present invention. A user makes a selection to the effect that shortcut allocation customisation mode is required and this is then confirmed to the user at step 701 to the effect that this mode has been entered.

At step 702 the system receives an identification from the user of a shortcut key for reallocation.

At step 703 a menu of functions is displayed to the user such that, at step 704, the system receives an indication of a particular function for shortcut key allocation in response to a function being selected from the menu being displayed at step 703.

At step 704 the system asks for the allocation to be confirmed such that a question is asked as to whether the allocation has been confirmed. If the allocation is not confirmed control is returned to step 702 allowing an alternative shortcut key to be selected. When the allocation is confirmed and the question asked at step 705 is answered in the affirmative, a text file is updated at step 706 whereafter control is returned to the main display at step 707.

Figure 8:
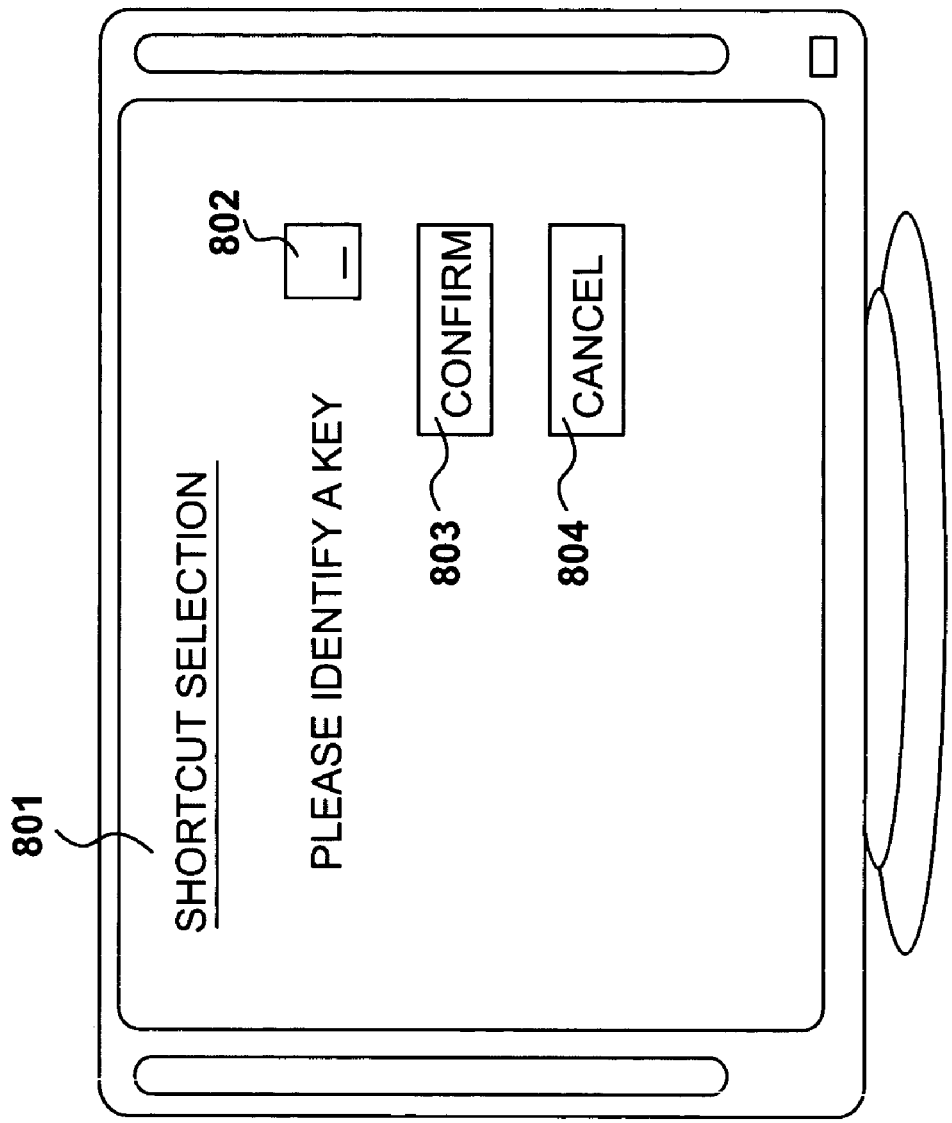
FIG. 8 shows a VDU screen display, according to one embodiment of the present invention.

As previously described, step 702 requires an identification of a shortcut key to be received. In order to receive this information, the system displays a screen to the user on VDU 104. FIG. 8 shows a VDU screen display, such as VDU 104, according to one embodiment of the present invention. The displayed screen confirms at 801 that a shortcut selection is to take place. In addition, a user is invited to press a shortcut key which is then confirmed by the key character appearing in a display box 802. Having selected this character, a user, by operation of mouse 103, is invited to confirm, by the operation of a button 803, that the selection is correct. Alternatively, in response to activation of button 804, the operation is cancelled. In one embodiment of the present invention, activation of a cancel button at any time during the allocation procedures results in control being directed to step 602.

Reception of the shortcut key identification is made to the system on activation of confirm button 803. As previously described, the system then displays a menu of available functions at step 703 as detailed in FIG. 9.

Figure 9:
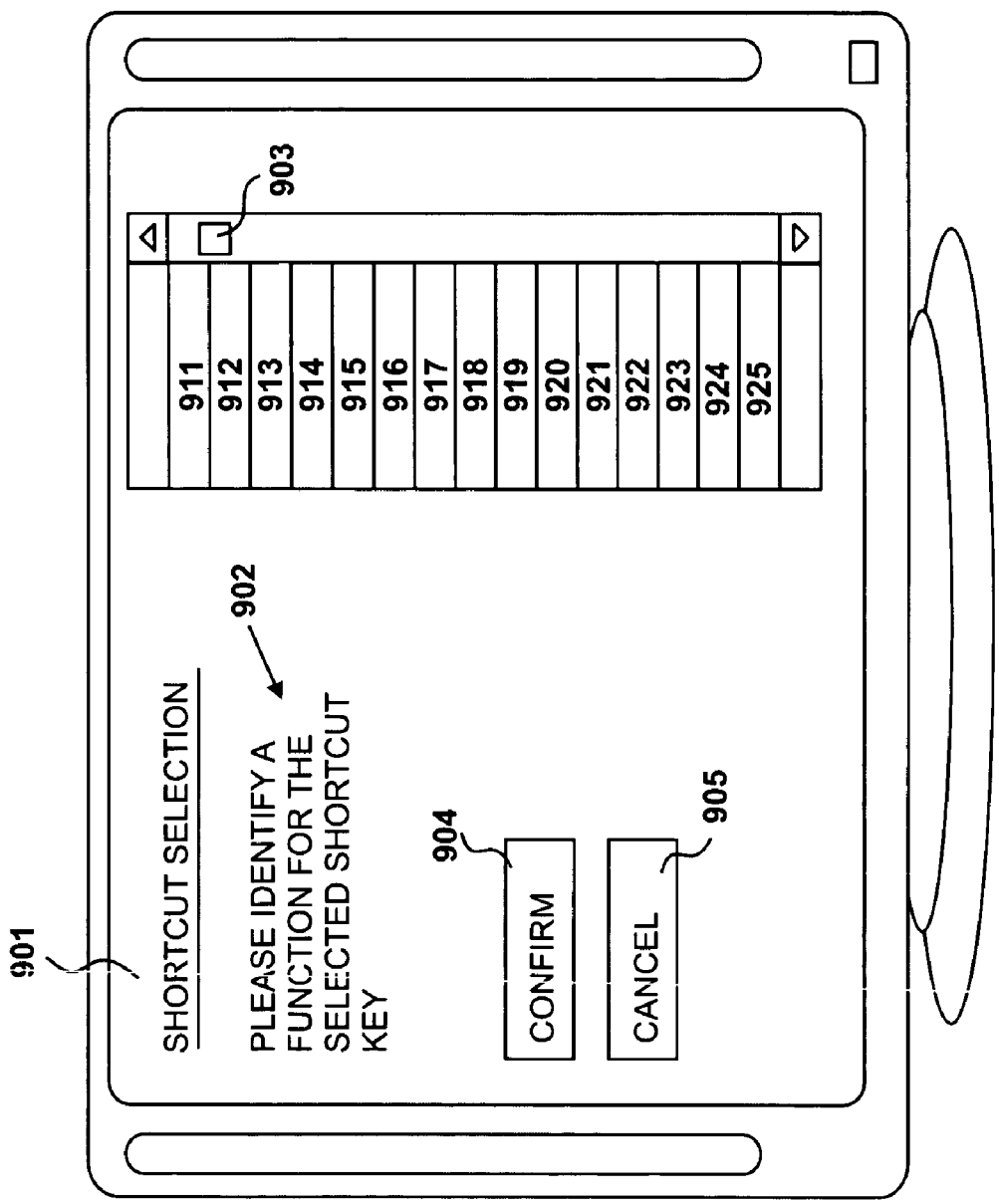
FIG. 9 shows a second stage VDU display, according to one embodiment of the present invention.

FIG. 9 shows a second stage VDU display, according to one embodiment of the present invention. The second stage screen shown in FIG. 9, generated in response to step 704, again results in the shortcut selection procedures being identified as such at 901. This is followed by a request at 902 inviting the user to identify a function from the selected shortcut key. In FIG. 9, the available functions, that will vary significantly depending upon the nature of the application, are illustrated by references 911 to 925. In this embodiment of the present invention, substantially more functions are available that may be accessed by operation of scroll bar 903. Thus, a specific function 911 to 925 is selected by operation of mouse 103 whereafter further operation of mouse 103 results in a confirm button 904 being selected or a cancel button 905 being selected. Operation of the cancel button, as previously described, results in control being directed to step 602. Alternatively, activation of confirm button 904 results in the system receiving an identification of the function selected as required at step 704.

Figure 10:
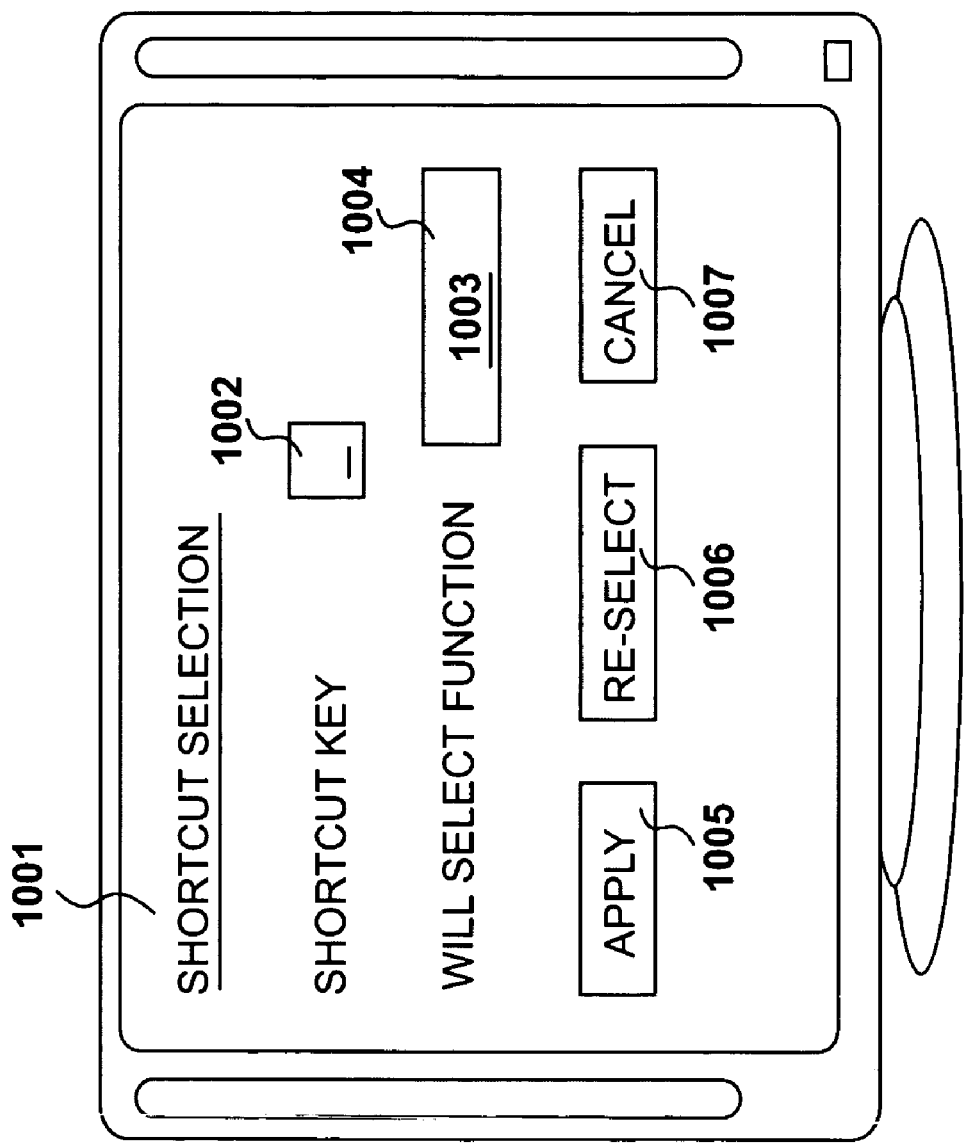
FIG. 10 shows a third stage VDU display, according to one embodiment of the present invention.

FIG. 10 shows a third stage VDU display, according to one embodiment of the present invention. A third level screen is shown in FIG. 10 which again presents confirmation at 1001 to the effect that shortcuts selection mode has been requested.

The shortcut key specified and reflected at box 802 is again reflected in box 1002. Furthermore a selected function 1003 is shown in box 1004. The user is then invited to make a selection from three buttons consisting of an apply button 1005, a reselect button 1006 and a cancel button 1007. As previously stated, operation of cancel button 1007 results in control being directed to step 602. Application, via mouse 103, of the reselect button 1006 results in the question asked at step 705 being answered in the negative and control being returned to step 702 such that an alternative identification may be made.

Activation of apply button 1005 results in the question asked at step 705 being answered in the affirmative, resulting in the text file being updated as part of the reconfiguration.

Figure 11:
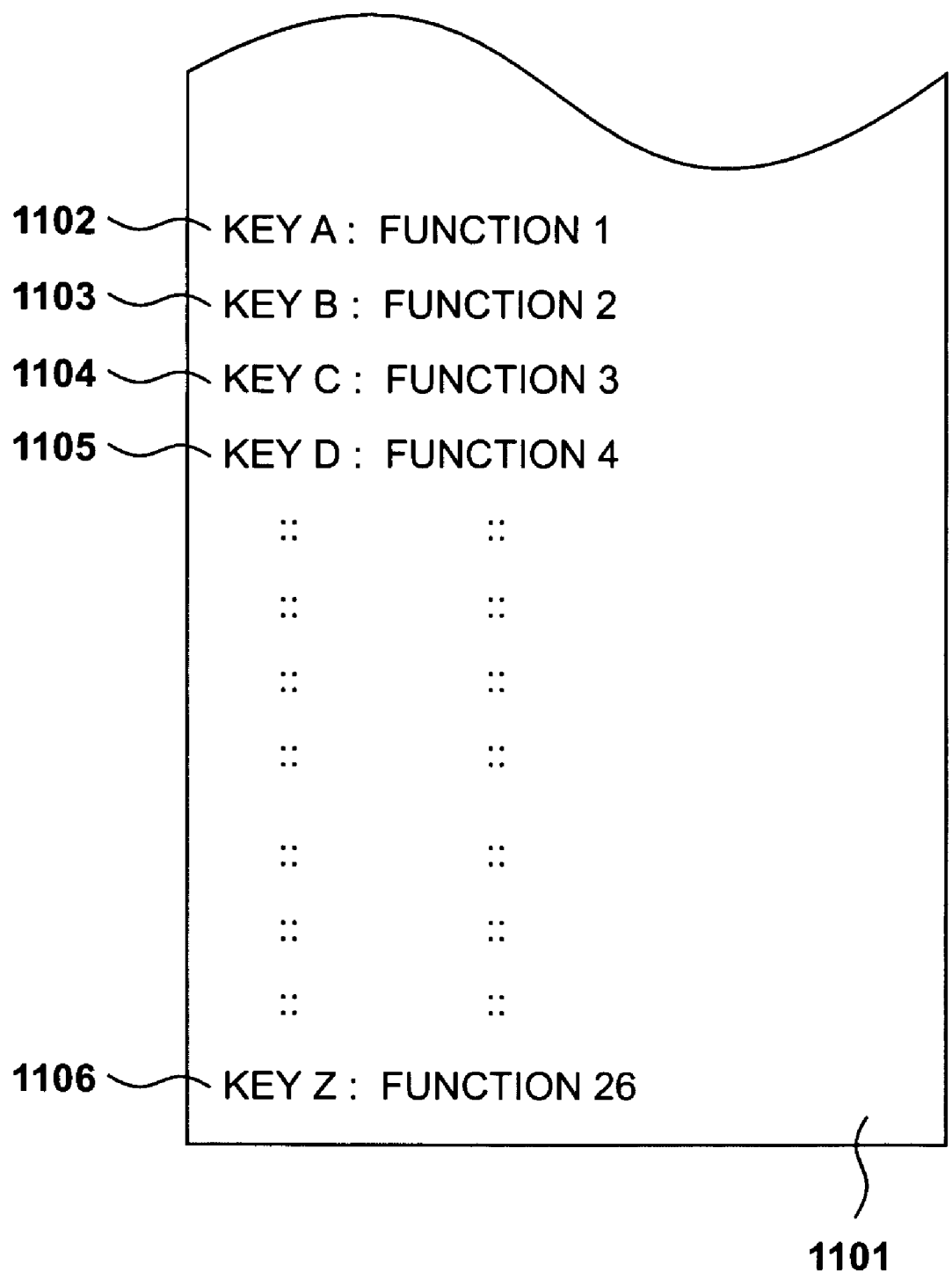
FIG. 11 shows an example of a text file, according to one embodiment of the present invention.

As previously stated, step 706 involves the updating of a text file. FIG. 11 shows an example of this text file 1001, according to one embodiment of the present invention. The text file records the configuration to the effect that shortcut key "A" will result in function one being selected as defined at line 1102. Similarly, the activation of shortcut key "B" will result in the selection of function two as illustrated at 1103. Similarly, the activation of shortcut key "C" will result in the selection of function three as illustrated at 1104 and function four will be selected by the activation of shortcut key "D" as illustrated at 1105. Thus, the file 1101 allows all twenty-six letter keys to be allocated as shortcut function-select keys up to key "Z" shown at 1106 that selects function twenty-six.

In an embodiment of the present invention, the application concerns the manipulation of three-dimensional image data and therefore the shortcut keys are allocated to functions relevant to this environment. Thus, purely as an illustrative example, control Q could be allocated to a move function, control W could be allocated to a select function, control E could be allocated to a zoom function and control R could be allocated to a scale function etc. In this embodiment of the present invention, shortcut keys have been identified as requiring application of the control key but in some application environments this may not be necessary and a shortcut function could be achieved without application of the control character. Furthermore, in an alternative embodiment of the present invention, control keys and other similar keys may be used in order for the letter keys to be used in several different ways thereby increasing the availability of shortcut functions. Furthermore, it can also be appreciated that as number of shortcut functions available within an application increases, the desirability to remind a user at start up of the specific allocations (particularly when a reconfiguration has occurred) becomes even more attractive.

Figure 12:
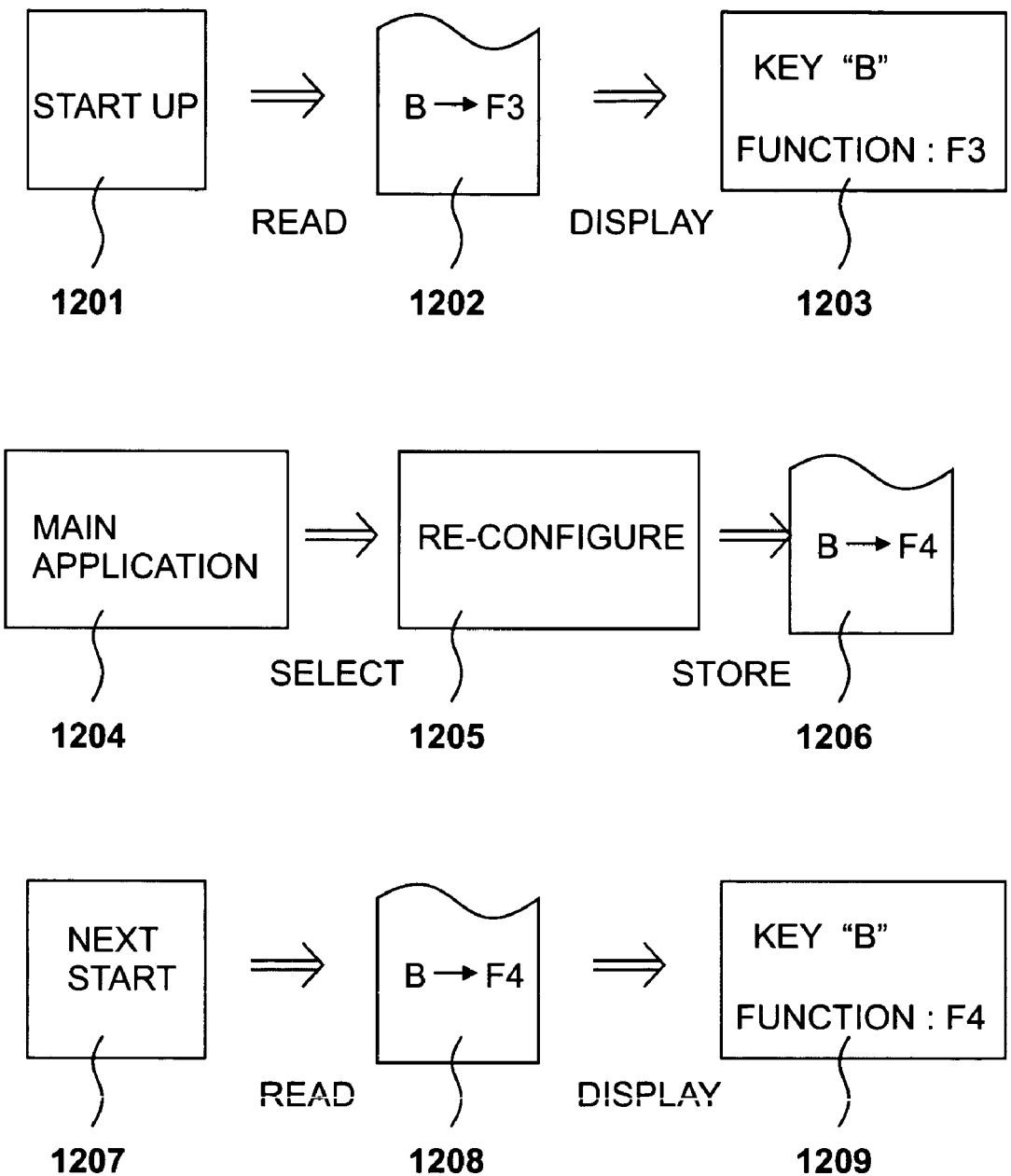
FIG. 12 shows an overview of operations performed by one embodiment of the present invention.

FIG. 12 shows an overview of operations performed by one embodiment of the present invention. System start-up is illustrated at 1201 resulting in text file 1202 being read. This text file includes information to the effect that activation of shortcut key "B" results in the application of function three, a zoom for example. During the start-up process, this information is displayed in the form of a splash screen 1203 to the effect that shortcut key "B" results in the zoom function F3 being selected.

After the loading process has been completed, a user may interact with the main application as illustrated at 1204. This may result in a selection being made to the effect that a reconfiguration of a shortcut key allocation is considered appropriate, as illustrated at 1205. Thus, a reallocation is defined to the effect that the pressing of shortcut key "B" now results in the application of function F4, such as a re-scaling in this example.

A subsequent start-up (not necessarily the next start-up) is illustrated at 1207 which again results in file 1202 being read. Again, for the purposes of this example, shortcut key "B" is selected for display resulting in information being displayed at 1209 to the effect that the pressing of shortcut key "B" now results in the application of function F4.

Thus, without incurring any significant additional overhead, it is possible to achieve a significant technical effect in terms of bringing useful operation related data to the notice of the user during a period (that is during start-up) where the user is required in order to initiate the process but the extent to which the user may do useful work is limited while the main application and its associated plug-ins are loaded.

The invention has been described above with reference to specific embodiments. Persons skilled in the art will recognize, however, that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

The invention claimed is:

1. A computer-readable medium storing instructions for causing a computer to display a splash screen when loading an application by performing the steps of:
    while the application is loading for a first time, reading operation data associated with the application from a text file, wherein the operation data specifies an assignment of a shortcut key to a first function;
    while the application is loading for the first time, displaying to an end-user a first splash screen based on the operation data that shows the assignment of the shortcut key to the first function;
    after the application is loaded, receiving an input from the end-user specifying a modification to the operation data that alters the assignment of the shortcut key to a second function, wherein each of the first function and the second function allows machine-readable definitions of three-dimensional objects associated with the application to be modified;
    producing re-configured operation data for the application based on the modification that specifies the assignment of the shortcut key to the second function;
    storing the re-configured operation data in the text file;
    shutting down the application in response to receiving a shutdown command;
    while the application is loading for a second time, reading the re-configured operation data from the text file; and
    while the application is loading for the second time, displaying to the end-user a second splash based on the re-configured operation data that shows the assignment of the shortcut key to the second function.

2. The computer-readable medium of claim 1, further comprising the step of displaying to the end-user an interface including the operation data to receive user input.

3. The computer-readable medium of claim 1, wherein the operation data includes information regarding functionality of the application.

4. A computer-implemented method for displaying a splash screen when loading an application, comprising:
    while the application is loading for a first time, reading operation data associated with the application from a text file, wherein the operation data specifies an assignment of a shortcut key to a first function;
    while the application is loading for the first time, displaying to an end-user a first splash screen based on the operation data that shows the assignment of the shortcut key to the first function;
    after the application is loaded, receiving an input from the end-user specifying a modification to the operation data that alters the assignment of the shortcut key to a second function, wherein each of the first function and the second function allows machine-readable definitions of three-dimensional objects associated with the application to be modified;
    producing re-configured operation data for the application based on the modification that specifies the assignment of the shortcut key to the second function;
    storing the re-configured operation data in the text file;
    shutting down the application in response to receiving a shutdown command;
    while the application is loading for a second time, reading the re-configured operation data from the text file; and
    while the application is loading for the second time, displaying to the end-user a second splash based on the re-configured operation data that shows the assignment of the shortcut key to the second function.

5. A computer system for displaying a splash screen when loading an application, the computer system comprising:

- means for, while the application is loading for a first time, reading operation data associated with the application from a text file, wherein the operation data specifies an assignment of a shortcut key to a first function;
- means for, while the application is loading for the first time, displaying to an end-user a first splash screen based on the operation data that shows the assignment of the shortcut key to the first function;
- means for, after the application is loaded, receiving an input from the end-user specifying a modification to the operation data that alters the assignment of the shortcut key to a second function, wherein each of the first function and the second function allows machine-readable definitions of three-dimensional objects associated with the application to be modified;
- means for producing re-configured operation data for the application based on the modification that specifies the assignment of the shortcut key to the second function;
- means for storing the re-configured operation data in the text file;
- means for shutting down the application in response to receiving a shutdown command;
- means for, while the application is loading for a second time, reading the re-configured operation data from the text file; and
- means for, while the application is loading for the second time, displaying to the end-user a second splash based on the re-configured operation data that shows the assignment of the shortcut key to the second function.

6. The computer system of claim 5, wherein the operation data includes information regarding functionality of the application.

7. The computer system of claim 5, further comprising means for displaying to the end-user an interface including a menu of functions available for assignment to a shortcut key.

8. The computer system of claim 5, wherein the operation data is stored in a user accessible text file.

9. The computer-readable medium of claim 1, further comprising displaying an interface that allows the end-user to confirm the assignment of the shortcut key to the second function.

10. The method of claim 4, further comprising displaying an interface that allows the end-user to confirm the assignment of the shortcut key to the second function.

11. The computer system of claim 5, further comprising displaying an interface that allows the end-user to confirm the assignment of the shortcut key to the second function.

12. The computer-readable medium of claim 1, wherein the first function is a move function, a select function, a zoom function, or a scale function.

13. The method of claim 4, wherein the first function is a move function, a select function, a zoom function, or a scale function.

14. The computer system of claim 5, wherein the first function is a move function, a select function, a zoom function, or a scale function.

* * * * *